United States Patent
Chae (10) Patent No.: US 9,966,674 B2
(45) Date of Patent: May 8, 2018

(54) TERMINATION KIT FOR DC CABLE

(71) Applicant: LS CABLE & SYSTEM LTD, Anyang-si, Gyeonggi-do (KR)

(72) Inventor: Byung Ha Chae, Gumi-si (KR)

(73) Assignee: LS CABLE & SYSTEM LTD., Anyang-si, Gyeonggi-do (KR)

( * ) Notice: Subject to any disclaimer, the term of this patent is extended or adjusted under 35 U.S.C. 154(b) by 0 days. days.

(21) Appl. No.: 15/120,592

(22) PCT Filed: Jul. 24, 2014

(86) PCT No.: PCT/KR2014/006739
§ 371 (c)(1),
(2) Date: Aug. 22, 2016

(87) PCT Pub. No.: WO2015/126020
PCT Pub. Date: Aug. 27, 2015

(65) Prior Publication Data
US 2017/0012371 A1 Jan. 12, 2017

(30) Foreign Application Priority Data

Feb. 21, 2014 (KR) .................. 10-2014-0020082
Jul. 17, 2014 (KR) .................. 10-2014-0090281

(51) Int. Cl.
*H01R 9/05* (2006.01)
*H01R 4/72* (2006.01)
(Continued)

(52) U.S. Cl.
CPC .............. *H01R 4/723* (2013.01); *H01B 9/02* (2013.01); *H01R 4/68* (2013.01); *H01R 4/72* (2013.01);
(Continued)

(58) Field of Classification Search
CPC . H01R 4/723; H01R 4/68; H01R 4/72; H01B 9/00; H01B 9/02; H02G 15/043;
(Continued)

(56) References Cited

U.S. PATENT DOCUMENTS 4,431,861 A * 2/1984 Clabburn ............ B29C 61/0616
156/86
4,737,318 A 4/1988 Ichino et al.
(Continued)

FOREIGN PATENT DOCUMENTS

EP 2639264 A1 9/2013
JP 2000-228813 A 8/2000
(Continued)

OTHER PUBLICATIONS

European Search Report for EP Application No. 14882989.8 dated Jul. 25, 2017 from European Patent Office.
(Continued)

*Primary Examiner* — William H Mayo, III
(74) *Attorney, Agent, or Firm* — Paratus Law Group, PLLC (57) ABSTRACT

A termination connection box for a direct-current (DC) cable, including: a connecting semiconducting layer configured to cover an exposed conductor of the DC cable and an insulating layer of the DC cable; a conductor withdrawal rod electrically connected to the exposed conductor of the DC cable; and a heat shrinkable tube formed of functionally gradient material having non-linear electrical characteristics. The heat shrinkable tube includes: a first end electrically connected to the conductor and which covers a portion of the conductor withdrawal rod and the connecting semiconducting layer; a second end opposite to the first end, electrically connected to the outer semiconducting layer, and which covers a portion of the outer semiconducting layer;
(Continued)

and a middle portion positioned between the first end and the second end, and which is in direct contact with and covers an outer circumferential surface of the insulating layer.

11 Claims, 9 Drawing Sheets (51) Int. Cl.
H01R 4/68 (2006.01)
H02G 15/04 (2006.01)
H02G 15/068 (2006.01)
H01B 9/02 (2006.01)
H02G 15/18 (2006.01)

(52) U.S. Cl.
CPC ......... *H02G 15/043* (2013.01); *H02G 15/046* (2013.01); *H02G 15/068* (2013.01); *H02G 15/1806* (2013.01)

(58) Field of Classification Search
CPC . H02G 15/046; H02G 15/068; H02G 15/1806
USPC ............. 174/110 R, 110 SR, 120 R, 120 AR, 174/120 SC
See application file for complete search history.

(56) References Cited

U.S. PATENT DOCUMENTS

| | | | | |
|---|---|---|---|---|
| 4,868,967 A * | 9/1989 | Holt | ........................ | F16L 5/02 |
| | | | | 174/135 |
| 6,111,200 A * | 8/2000 | De Schrijver | ........ | B29C 61/065 |
| | | | | 174/74 A |
| 8,399,766 B2 * | 3/2013 | Hane | ..................... | H01R 13/53 |
| | | | | 174/84 R |
| 8,410,366 B2 * | 4/2013 | Tognali | .................. | H02G 15/10 |
| | | | | 174/84 R |
| 2012/0012362 A1 * | 1/2012 | Kim | ...................... | H01B 3/004 |
| | | | | 174/118 |
| 2013/0075124 A1 | 3/2013 | Li et al. | | |
| 2013/0078836 A1 | 3/2013 | Li et al. | | |
| 2014/0370741 A1 * | 12/2014 | Bolcato | ................ | G01R 15/142 |
| | | | | 439/471 |

FOREIGN PATENT DOCUMENTS

| | | |
|---|---|---|
| JP | 2002-095125 A | 3/2002 |
| KR | 10-1998-0045875 A | 9/1998 |
| KR | 10-2001-0060860 A | 7/2001 |
| WO | WO 2013/004748 A2 | 1/2013 |

OTHER PUBLICATIONS

Ryosuke Hata, Sumitomo Electric Industries, Ltd., "Solid DC Submarine Cable Insulated with PPLP (Polypropylene Laminated Paper)", Retrieved from the Internet: http://www.w2agz.com/Documents/Sumitomo%20Bakun%20Project%20IERE2005SApaper051004.pdf, Jul. 3, 2010, pp. 1-10.
3M Electrical Products Division: "Scotch Electrical Semi-Conducting Tape 13", Internet Citation, Retrieved from the Internet: http://multimedia.3m.com/mws/media/411340/scotch-electrical-semi-conducting-tape-13.pdf, Sep. 2012, pp. 1-4.
International Search Report for PCT/KR2014/006739 dated Nov. 19, 2014 from Korean Intellectual Property Office.

* cited by examiner

TERMINATION KIT FOR DC CABLE

CROSS REFERENCE TO PRIOR APPLICATIONS

This application is a National Stage Patent Application of PCT International Patent Application No. PCT/KR2014/006739 (filed on Jul. 24, 2014) under 35 U.S.C. § 371, which claims priority to Korean Patent Application Nos. 10-2014-0020082 (filed on Feb. 21, 2014) and 10-2014-0090281 (filed on Jul. 17, 2014), which are all hereby incorporated by reference in their entirety.

BACKGROUND

1. Field

The present invention relates to a termination connection box for a direct-current (DC) cable, and more particularly, to a termination connection box capable of decreasing a resistance value at an end portion of a DC cable and forming a uniform resistance distribution to prevent an electric field from being locally concentrated.

2. Description of the Related Art

In general, power cables which are devices transferring power using a conductor therein may be classified into a direct-current (DC) power cable and an alternating-current (AC) power cable.

When a joint box or a termination connection box according to the related art is used to connect ends of DC power cables or connect a DC power cable to an aerial wire, the system is complicated in structure and thus it may take a large amount of time to install or build it.

To solve this problem, in the related art, when a termination connection box structure for a DC power cable is provided, a conductor of this cable is electrically connected to an outer semiconducting layer by applying resistive paint onto an insulator region of an end portion of this cable, from which the outer semiconducting layer is removed. Thus, a resistance component is distributed between the conductor and the outer semiconducting layer and thus an electric field may be divided.

However, in the termination connection box according to the related art, when the resistive paint is applied onto a surface of an insulator of the cable, the resistive paint should be applied to a predetermined thickness or more so as to obtain the effect of dividing an electric field. Thus, a process of repeatedly applying the resistive paint several times should be performed. When this process is performed, it is difficult to maintain the applied resistive paint to a uniform thickness and thus a uniform resistance distribution may not be achieved. Furthermore, a foreign substance such as moisture may penetrate an interface between the insulator and the resistive paint and the applied paint or a void may be formed at the interface between the insulator and the resistive paint and the applied paint.

U.S. Pat. No. 4,737,318 (hereinafter referred to as 'Document 1') discloses a joint box or a termination connection box for an AC cable, in which a first layer covering a portion of an insulating layer and formed of a heat shrinkable tube, an external heat shrinkable tube, and a second layer coated onto an inner side of the external heat shrinkable tube are provided. The first layer has a linear AC electrical property and the second layer has a non-linear AC electrical property. However, Document 1 relates to connection of an AC cable, in which the first layer and the second layer are not configured to connect a conductor to an outer semiconducting layer.

US 2013-0078836 (hereinafter referred to as 'Document 2'), US 2013-0075124 (hereinafter referred to as 'Document 3'), and EP 2639264 (hereinafter referred to as 'Document 4') disclose structures of a termination unit of a DC cable which includes a layer formed of a so-called field grading material (FGM). However, in Documents 2 and 3, an FGM layer is formed by coating or painting or in the form of a sleeve or tape. When the FGM layer is formed by coating or painting or in the form of tape, it is very difficult to form the FGM layer to a uniform thickness while preventing a foreign substance from penetrating the FGM layer. When the FGM layer is formed in the form of sleeve, the FGM layer may be formed to a uniform thickness but it is difficult to prevent a foreign substance from penetrating the FGM layer or a void from being generating in the FGM layer. In Document 4, an FGM layer includes an injection layer. However, when the FGM layer is an injection layer, it is not easy to install and assemble the DC cable.

PCT/EP2012/063041 (hereinafter referred to as 'Document 5') discloses a joint box for a high-voltage cable, in which a resistance layer having a region which gradually increases toward an external triple point is provided. The resistance layer changes the position of the triple point and thus the concentration of an electric field is reduced. However, in Document 5, the resistance layer simply changes the position of the triple point and thus the effect of concentrating an electric field is low. Furthermore, the resistance layer is formed by injection molding or the like and it is thus difficult to install and assemble the DC cable, similar to Document 4.

SUMMARY

The technical purpose of the present invention is to provide a termination connection box for a direct-current (DC) power cable, which is capable of achieving a uniform resistance distribution and decreasing a resistance value.

Furthermore, the technical purpose of the present invention is to provide a termination connection box capable of preventing an electric field from being locally concentrated on an end portion of an outer semiconducting layer at an end portion of a DC power cable, thereby improving insulating performance.

In addition, the technical purpose of the present invention is to provide a terminal structure in which a uniform resistance distribution is maintained at an end portion of a DC power cable, thereby achieving a uniform electric field.

According to an aspect of example embodiment, there is provided a termination box for a direct-current (DC) cable, in which when an outer semiconducting layer, an insulating layer, and an inner semiconducting layer are sequentially removed, a conductor is exposed, the termination box comprises a connecting semiconducting layer configured to cover the exposed conductor and the insulating layer, a conductor withdrawal rod electrically connected to the conductor, and a heat shrinkable tube configured such that one portion thereof covers an outer circumferential surface of the cable insulating layer and one end and another end thereof are respectively electrically connected to the conductor and the outer semiconducting layer.

The other end of the heat shrinkable tube covers at least a portion of the conductor withdrawal rod or at least a portion of a semiconducting tape.

At least a portion of the heat shrinkable tube is thicker than a remaining region thereof.

The heat shrinkable tube is thicker on an end portion of the outer semiconducting layer than on a remaining portion of the outer semiconducting layer.

The heat shrinkable tube comprises a first heat shrinkable tube configured such that one end and another end thereof on the conductor of the cable are respectively electrically connected to the conductor and the outer semiconducting layer and a second heat shrinkable tube formed on an outer side of the first heat shrinkable tube to a predetermined length.

The heat shrinkable tube has a volume resistance of $10^8$ to $10^{11}$ Ωm.

The heat shrinkable tube has a relative permittivity of 15 or more.

The heat shrinkable tube comprises a mixture of a polymer and at least one among ZnO, carbon black, and SiC.

According to another aspect of example embodiment, there is provided a direct-current (DC) cable comprising the termination box of any one of the above-mentioned features.

The DC cable comprises an insulating layer formed of a cross-linked polyethylene composition including 0.2 to 5 parts by weight of magnesium oxide with respect to 100 parts by weight of polyethylene resin.

A conductor, an inner semiconducting layer, an insulating layer, and an outer semiconducting layer are sequentially formed, wherein at least a portion of the insulating layer is formed of compound insulating paper in which kraft paper is stacked on top and bottom surfaces of polypropylene resin.

The insulating layer comprises insulating paper in which a surface thereof which is in contact with the inner semiconducting layer and a surface thereof which is in contact with the outer semiconducting layer are formed of only kraft paper.

DETAILED DESCRIPTION

Hereinafter, various embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. The same reference numerals represent the same elements throughout the drawings.

Figure 1:
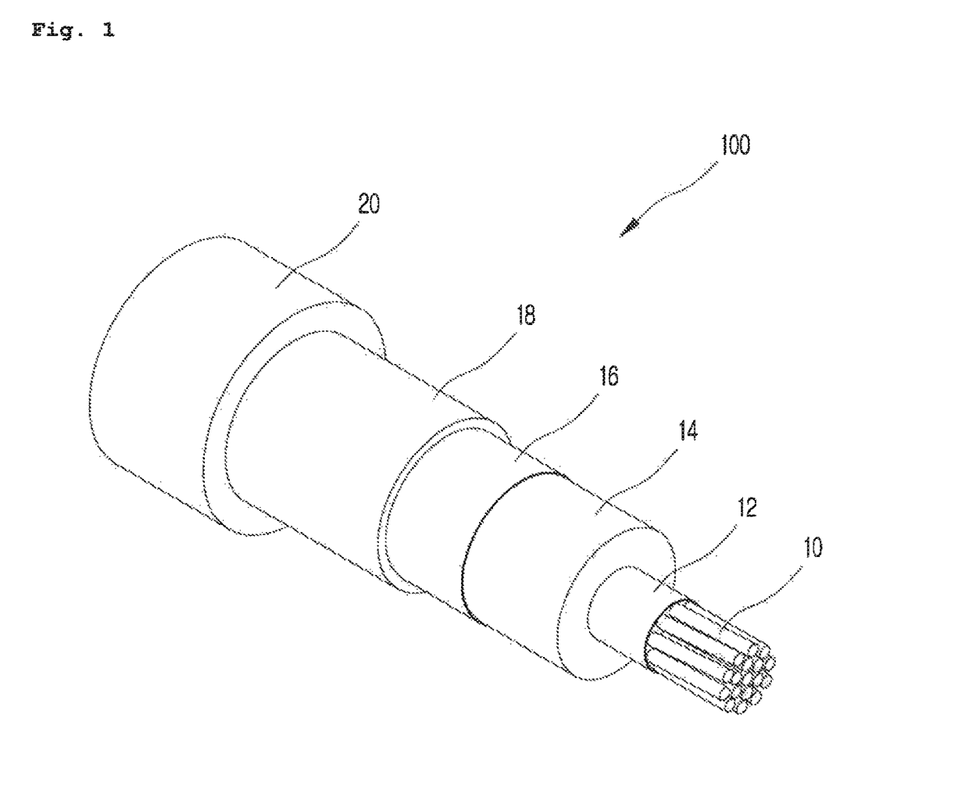
FIG. 1 is a perspective view illustrating an inner structure of a direct-current (DC) power cable including an insulating layer formed of cross-linked polyethylene (XLPE)

FIG. 1 is a perspective view illustrating an inner structure of a direct-current (DC) power cable 100 including an insulating layer formed of cross-linked polyethylene (XLPE).

Referring to FIG. 1, the DC power cable 100 includes a conductor 10 at a center thereof. The conductor 10 acts as a path through which current flows and may be formed of, for example, copper, aluminum, or the like. The conductor 10 is formed by stranding a plurality of element wires 11 together.

However, the conductor 10 has a non-smooth surface and thus an electric field thereon may be not uniform. A corona discharge is likely to occur locally in the conductor 10. Furthermore, when a void is generated between a surface of the conductor 10 and an insulating layer 14 which will be described below, the insulating performance of the DC power cable 100 may be degraded. To solve this problem, an external surface of the conductor 10 may be covered with a semiconducting material such as semiconducting carbon paper. Here, a layer formed of the semiconducting material will be defined as an inner semiconducting layer 12.

The inner semiconducting layer 12 makes a charge distribution uniform on a surface of the conductor 10 to achieve a uniform electric field, thereby improving the dielectric strength of the insulating layer 14 to be described below. Furthermore, the inner semiconducting layer 12 prevents a gap from occurring between the conductor 10 and the insulating layer 14 so as to prevent occurrence of a corona discharge and ionization. In addition, the inner semiconducting layer 12 blocks the insulating layer 14 from penetrating the inside of the conductor 10 during manufacture of the DC power cable 100.

The insulating layer 14 is provided on an outer side of the inner semiconducting layer 12. The insulating layer 14 electrically insulates the conductor 10 from the outside. In general, a high breakdown voltage of the insulating layer 14 should be high and the insulating performance thereof should be stably maintained for a long time. Furthermore, the insulating layer 14 should have a low dielectric loss and thermal-resistance performance such as a heat-resisting property. Thus, the insulating layer 14 is formed of polyolefin resin such as polyethylene and polypropylene, and may be formed of polyethylene resin. The polyethylene resin may be cross-linked resin and may be manufactured using silane or organic peroxide, e.g., dicumyl peroxide (DCP), as a cross-linking agent.

However, when a high DC voltage is applied to the DC power cable 100, charges may be injected from the conductor 10 to the inner semiconducting layer 12, the insulating layer 14, etc. Thus space charges may be formed in the insulating layer 14. The space charges are accumulated in the insulating layer 14 according to a period of use of the DC power cable 100. The accumulated space charges sharply increase the intensity of an electric field near the conductor 10 and thus a breakdown voltage of the DC power cable 100 decreases when an impulse voltage is applied to the DC power cable 100 or when the polarity of a DC voltage applied to the DC power cable 100 is suddenly reversed.

Thus, the insulating layer 14 may include inorganic particles as well as cross-linking resin. Nano-sized aluminum silicate, nano-sized calcium silicate, nano-sized calcium carbonate, nano-sized magnesium oxide, or the like may be used as the inorganic particles. Magnesium oxide may be used as the inorganic particles when the impulse strength of the insulating layer 14 is taken into account. The magnesium oxide may be obtained from natural magnesium ore but may be produced from an artificial synthetic material using magnesium salt contained in seawater, and may be provided as a high-purity material with stable quality or physical property.

The magnesium oxide basically has a face-centered cubic structure as a crystalline structure but the shape, purity, degree of crystallinity, or physical property thereof may vary according to a method of synthesizing the magnesium oxide. In detail, magnesium oxides may be classified into a cubic type, a terrace type, a rod type, a porous type, and a spherical type, and may be variously used according to a unique physical property thereof. The inorganic particles such as magnesium oxide form a potential well at a border between base resin and the inorganic particles, thereby suppressing movement of charges and accumulation of space charges when an electric field is applied to the DC power cable 100.

However, the inorganic particles work as impurities when a large amount of the inorganic particles are added to the insulating layer 14, and decrease impulse strength of the DC power cable 100 which is an important feature when even a small amount of the inorganic particles are used. Thus, since the amount of accumulated space charges cannot be sufficiently decreased only using the inorganic particles, 0.2 to 5 parts by weight of the inorganic particles may be added with respect to 100 parts by weight of insulating base resin. For example, the insulating layer 14 may be a cross-linked polyethylene composition containing 0.2 to 5 parts by weight of magnesium oxide with respect to 100 parts by weight of polyethylene resin.

Unless the outside of the insulating layer 14 as well as the inside thereof is not shielded, a portion of an electric field is absorbed into the insulating layer 14 but the remaining electric field is discharged to the outside. In this case, when the electric field increases to a predetermined level or more, the insulating layer 14 and an outer cover 20 of the power cable 100 may be broken by the electric field. Thus, a semiconducting layer is provided at an outer side of the insulating layer 14. This semiconductor layer will be defined as an outer semiconducting layer 16 to be distinguished from the inner semiconducting layer 12 described above. Thus, the outer semiconducting layer 16 improves the dielectric strength of the insulating layer 14 by causing an electric force line distribution between the outer semiconducting layer 16 and the inner semiconducting layer 12 to have an equipotential level. Furthermore, the outer semiconducting layer 16 may planarize a surface of the insulating layer 14 to lessen concentration of an electric field in the DC power cable 100, thereby preventing a corona discharge from occurring.

A shield layer 18 formed of a metal sheath or a neutral line according to the type of the DC power cable 100 is provided at an outer side of the outer semiconducting layer 16. The shield layer 18 is provided for electrical shielding and a return circuit of short-circuit current.

The outer cover 20 is provided at an outer side of the DC power cable 100. The outer cover 20 is provided at the outer side of the DC power cable 100 to protect the inner elements of the cable 100. Thus, the outer cover 20 has a weatherproof resistance to various natural environmental conditions, including various weather conditions such as light, wind and rain, moisture, a gas contained in air, etc.; chemical resistance to medicine such as a chemical material; and high mechanical strength. In general, the outer cover 20 is formed of a material such as polyvinyl chloride (PVC) or polyethylene (PE).

Figure 2:
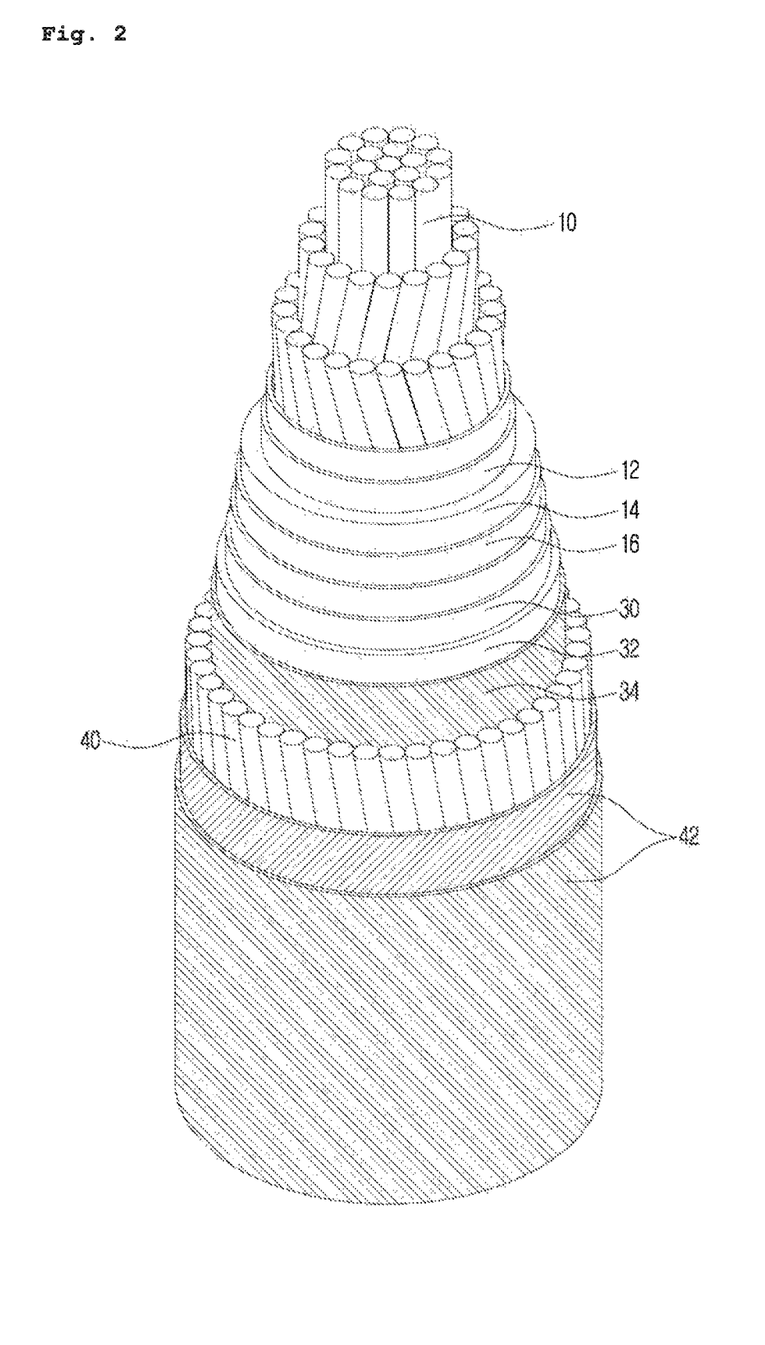
FIG. 2 is a perspective view illustrating an inner structure of a DC submarine cable including an insulating layer formed of XLPE.

FIG. 2 is a perspective view illustrating an inner structure of a DC submarine cable according to another embodiment of the present invention. FIG. 2 illustrates the structure of a power cable available as a so-called submarine cable connecting areas on the ground through the sea. The embodiment of FIG. 2 will be described focusing on the differences from the embodiment of FIG. 1 described above.

Referring to FIG. 2, a conductor 10, an inner semiconducting layer 12, an insulating layer 14, and an outer semiconducting layer 16 are substantially the same as those of the embodiment of FIG. 1 described above and are not thus redundantly described here.

A metal sheath 30 formed of lead, which is a so-called 'lead sheath', is provided at an outer side of the outer semiconducting layer 16 to prevent the insulating performance of the insulating layer 14 from being degraded when a foreign substance, such as water from the outside, penetrates the DC submarine cable 200.

Furthermore, a sheath 32 formed of resin such as polyethylene and a bedding layer 34 preventing the DC submarine cable 200 from being exposed directly to water are provided outside the metal sheath 30. A sheathing wire 40 may be provided on the bedding layer 34. The sheathing wire 40 is provided at an outer side of the DC submarine cable 200 to increase the mechanical strength of the DC submarine cable 200, so that the DC submarine cable 200 may be protected from an external environment of the bottom of the sea.

A jacket 42 is provided as an exterior of the DC submarine cable 200 at an outer side of the sheathing wire 40, i.e. the outer side of the DC submarine cable 200. The jacket 42 is provided at the outer side of the cable 200 to protect the inner elements of the cable 200. In particular, in the case of a submarine cable, the jacket 42 has weather resistance to an underwater environment such as seawater, and high mechanical strength. For example, the jacket 42 may be formed of polypropylene yarn or the like.

Figure 3:
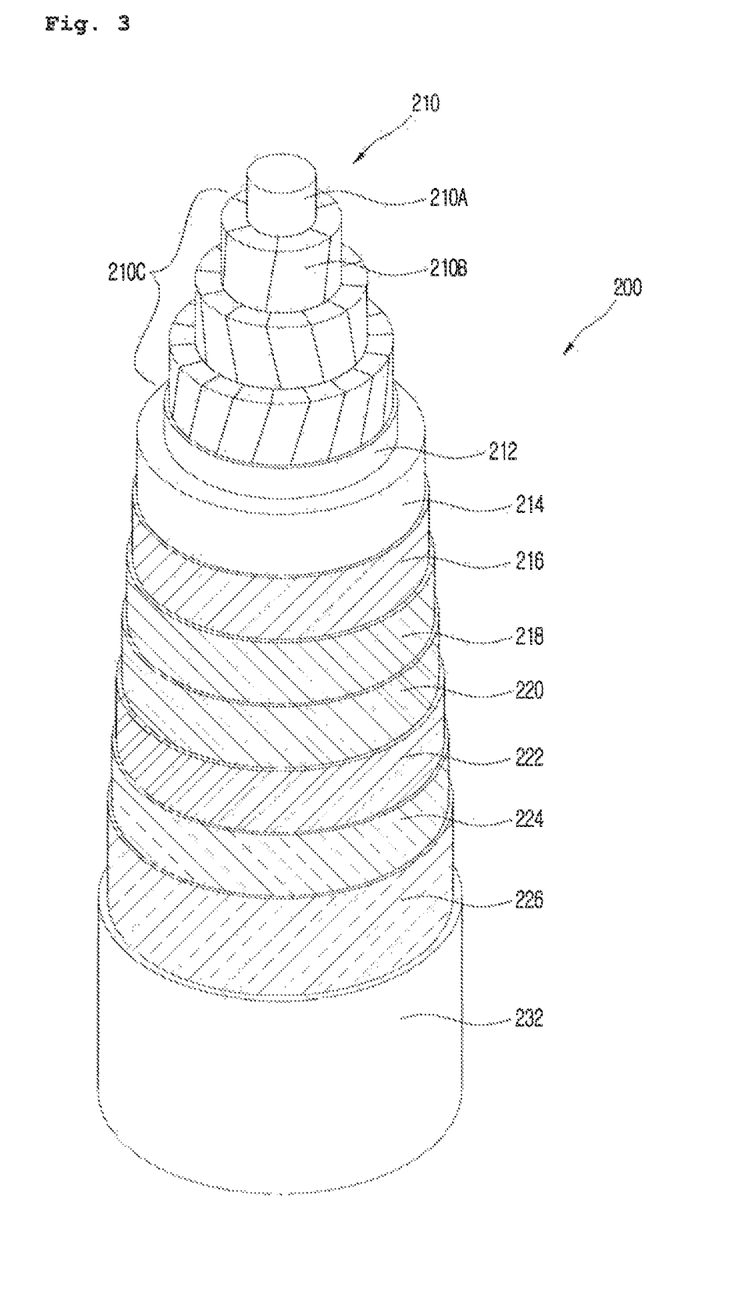
FIG. 3 is a perspective view illustrating an inner structure of a DC power cable including insulating paper impregnated with insulating oil.

FIG. 3 illustrates an inner structure of a DC power cable 200 including insulating paper according to another embodiment of the present invention. The DC power cable 200 of FIG. 3 is different from the power cables 100 according to the previous embodiments in terms of the structures of an inner conductor and an insulating layer. The DC power cable 200 of FIG. 3 will now be described focusing on the differences from the power cables 100 according to the previous embodiments.

FIG. 3 is a partially-exploded perspective view illustrating an inner structure of a DC power cable 200 including insulating paper impregnated with insulating oil which is a so-called 'paper insulation power cable'.

Referring to FIG. 3, the DC power cable 200 includes a conductor 210 at a center thereof. The conductor 210 acts as a path through which current flows. As illustrated in FIG. 3, the conductor 210 may include a flat element wire layer 210C including a central element wire 210A having a round shape and flat element wires 210B stranded together to cover the central element wire 210A. The flat element wire layer 210C is manufactured by forming the flat element wires 210B to have tetragonal cross-sections according to a continuous extrusion process and stranding the flat element wires 210B together on the central element wire 210A. The conductor 210 is formed in a round shape. The conductor 210 may be formed by stranding a plurality of round element wires together as illustrated in FIG. 3. However, a conductor formed of flat element wires has a higher space factor than that of a conductor formed of round element wires and may be thus appropriate for a high-voltage power cable.

An inner semiconducting layer 212 formed on a surface of the conductor 210 and an outer semiconducting layer 216 formed on an insulating layer 214 which will be described below are substantially the same as those of FIG. 1 described above and are not be redundantly described here.

The insulating layer 214 is provided at an outer side of the inner semiconducting layer 212. The insulating layer 214 electrically insulates the conductor 210 from the outside. Referring to FIG. 3, the insulating layer 214 is formed according to a paper insulation process of winding insulating paper around a surface of the inner semiconducting layer 212. Furthermore, in order to improve an insulating property of the DC power cable 200, the conductor 210 wound with the insulating paper is impregnated with insulating oil. The insulating oil is absorbed in the insulating paper through this impregnation process. The DC power cable 200 may be classified as an oil-filled (OF) cable or a mass-impregnated (MI) cable according to the viscosity of the insulating oil.

A length to which the OF cable is extendable is limited, since insulating paper is impregnated with relatively low viscosity insulating oil and the OF cable should be operated by applying pressure to the insulating oil to maintain an oil pressure at a predetermined level. In contrast, a length to which the MI cable is extendable is long, since insulating paper is impregnated with relatively high viscosity insulating oil, a flow rate of the insulating oil in the insulating paper is thus low, and therefore, oil pressure need not be maintained at a predetermined level.

In the present embodiment, the insulating layer 214 is formed by coiling a plurality of pieces of insulating paper. For example, the insulating layer 214 may be formed by repeatedly coiling either kraft paper or kraft paper and thermoplastic resin such as polypropylene resin.

In detail, the insulating layer 214 may be formed by winding only kraft paper but at least a portion of the insulating layer 214 may be formed by winding compound insulating paper, e.g., insulating paper in which kraft paper is stacked on top and bottom surfaces of polypropylene resin.

In the case of the MI cable formed by winding only kraft paper and impregnating the kraft paper with insulating oil, a temperature difference occurs inside a radial direction (i.e., outside a radial direction of a portion of an insulating layer in a direction of an inner semiconducting layer, i.e., on a portion of the insulating layer in a direction of an outer semiconducting layer to be described below) due to current flowing through a conductor of the cable when this cable is operated (when current is conducted through this cable). Thus, the insulating oil of the portion of the insulating layer (which is at a higher temperature) in the direction of the inner semiconducting layer becomes low in viscosity and thermally expands to move outside the radial direction. When the temperature of the portion of the insulating layer decreases, the insulating oil moving due to the thermal expansion thereof increases in viscosity but does not return to the original state thereof. Thus, bubbles occur inside the radial direction, i.e., at the portion of the insulating layer in the direction of the inner semiconducting layer, thereby degrading the insulating performance of the cable.

However, if the insulating layer 214 is formed of compound insulating paper as described above, when the cable is operated, thermoplastic resin, such as polypropylene resin, which is not impregnated with the insulating oil may thermally expand and thus suppress the flow of the insulating oil. More electric fields may be assigned to polypropylene resin having higher resistivity and higher dielectric strength than those of kraft paper according to resistive electric field distribution characteristics of a DC cable in which an electric field is distributed according to resistivity. Electric fields assigned to bubbles occurring as the insulating oil shrinks or expands due to a change in temperature when the cable is operated or short-circuited may be decreased.

Furthermore, since polypropylene resin is not impregnated with the insulating oil, the insulating oil may be suppressed from flowing in a direction of the diameter of the cable due to the force of gravity. In addition, the flow of the insulating oil may be more suppressed, since polypropylene resin thermally expands according to impregnation temperature during the manufacture of the cable or working temperature of the cable when the cable is operated and thus applies surface pressure to the kraft paper.

The compound insulating paper may be a structure in which kraft paper is stacked on one surface of thermoplastic resin such as polypropylene resin, a structure in which thermoplastic resin such as polypropylene resin is stacked on top and bottom surfaces of kraft paper, a structure in which kraft paper and thermoplastic resin such as polypropylene resin are alternately stacked in four layers or more, or the like. In this case, an operation and effect of the compound insulating paper are the same as those of the insulating paper having a structure in which kraft paper is stacked on the top and bottom surfaces of polypropylene resin.

In addition, the insulating layer 214 may be formed by winding the compound insulating paper such that one or both of a surface thereof which is in contact with the inner semiconducting layer 212 and a surface thereof which is in contact with the outer semiconducting layer 216 are formed by winding insulating paper formed of only kraft paper. Both of the surfaces of the insulating layer 214 which are in contact with the inner semiconducting layer 212 and the outer semiconducting layer 216 may be formed by winding insulating paper formed of only kraft paper.

In this case, since one or both of the surfaces of the insulating layer 214 which are in contact with the inner semiconducting layer 212 and the outer semiconducting layer 216 are formed of the kraft paper having lower resistivity than that of the compound insulating paper, an electric field may be decreased by the kraft paper layer to prevent degradation of impulse breakdown characteristics even when bubbles occur at an impulse breakdown point, e.g., an interface between the insulating layer 214 and the inner semiconducting layer 212 or an interface between the insulating layer 214 and the outer semiconducting layer 216b. Furthermore, the kraft paper hardly has a polar effect with respect to impulse breakdown and may thus decrease impulses caused by the polar effect when plastic laminated paper is used.

Furthermore, more electric fields may be distributed on the compound insulating paper having higher resistivity than that of the kraft paper according to resistive electric field distribution characteristics of a DC cable in which an electric field is distributed according to resistivity. Accordingly, since the intensity of the electric field on the kraft paper may be lower than that on the compound insulating paper, the kraft paper may have relatively high temperature and thus the insulating oil may relatively actively shrink or expand when the cable is operated, thereby increasing a possibility of generating bubbles. Furthermore, the insulating layer is formed by winding the kraft paper on a portion of a section right above a conductor having a high-intensity electric field, i.e., an interface between an inner semiconducting layer and an insulating layer and/or an outer portion of the insulating layer at which the intensity of an electric field increases due to reversal of the electric field as temperature increases when the cable is operated, i.e., an interface between the outer semiconducting layer and the insulating layer, thereby stabilizing the insulating performance of the insulating layer.

The outer semiconducting layer 216 is provided at an outer side of the insulating layer 214. The outer semiconducting layer 216 is as described above with reference to FIG. 1 and is not redundantly described here.

A woven copper wire tape 218 is provided at an outer side of the outer semiconducting layer 216. Furthermore, a metal sheath 220 formed of lead, i.e., a so-called lead sheath, is provided at an outer side of the woven copper wire tape 218 to prevent the insulating performance of either the insulating oil impregnated in the insulating layer 214 or an insulating compound from being degraded when a foreign substance such as water from the outside penetrates the DC cable 200.

A bedding layer 222 is provided at an outer side of the metal sheath 220 so that the metal sheath 220 may not be in direct contact with water. A non-woven fabric tape 224 and a proofed tape 226 are formed on the bedding layer 222 to cover the bedding layer 222. A jacket 232 is provided as an exterior of the cable 200 at an outer side of the cable 200. The jacket 232 is provided at an outer side of the MI cable 200 to protect the inner elements of the cable 200. The jacket 232 may be formed, for example, polyethylene (PE) to have weather resistance to various environmental conditions and high mechanical strength.

Figure 4:
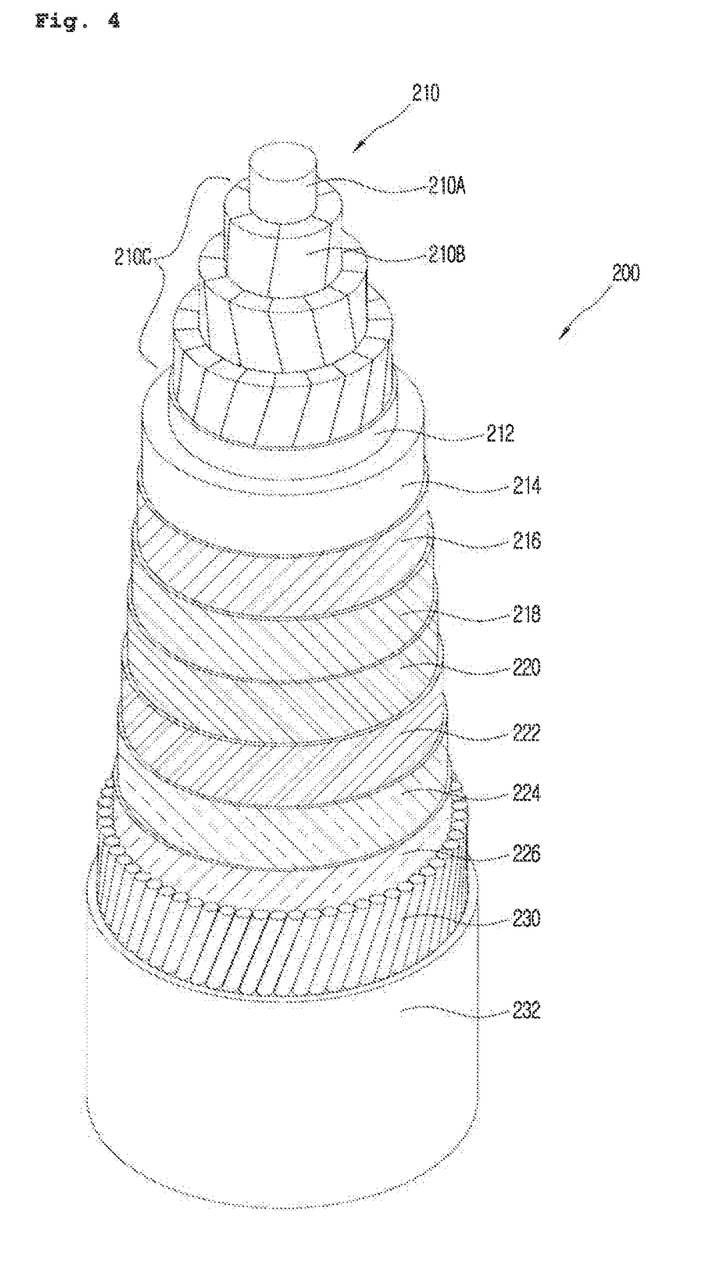
FIG. 4 is a perspective view illustrating an inner structure of a DC submarine power cable including insulating paper impregnated with insulating oil.

FIG. 4 is a partially exploded perspective view illustrating an inner structure of a paper insulating power cable 200 according to another embodiment of the present invention. FIG. 4 illustrates the structure of a power cable available, for example, as a so-called submarine cable connecting areas on the ground through the sea. The paper insulating power cable 200 of FIG. 4 will be described focusing on the differences from the DC power cable 200 according to the embodiment of FIG. 3.

Referring to FIG. 4, the paper insulating power cable 200 available as a submarine cable includes a sheathing wire 230 covering an outer side of the paper insulating power cable 200 with wire to increase the mechanical strength of the paper insulating power cable 200, so that the cable 200 may be protected from an external undersea environment. In detail, in the embodiment of FIG. 3 described above, the sheathing wire 230 may be provided at an outer side of the proofed tape 226, or an outer side of the proofed tape 226 may be wound with a non-woven fabric tape (not shown) and the sheathing wire 230 may be provided to wind the non-woven fabric tape.

A jacket 232 is provided as an exterior of the paper insulating power cable 200 at an outer side of the sheathing wire 230, i.e., at an outer side of the paper insulating power cable 200. The jacket 232 is provided at an outer side of the paper insulating power cable 200 to protect the inner elements of the paper insulating power cable 200. In particular, in the case of a submarine cable, the jacket 232 has weather resistance to an undersea environment such as seawater, and high mechanical strength. For example, the jacket 232 may be formed of polypropylene yarn or the like.

Figure 5:
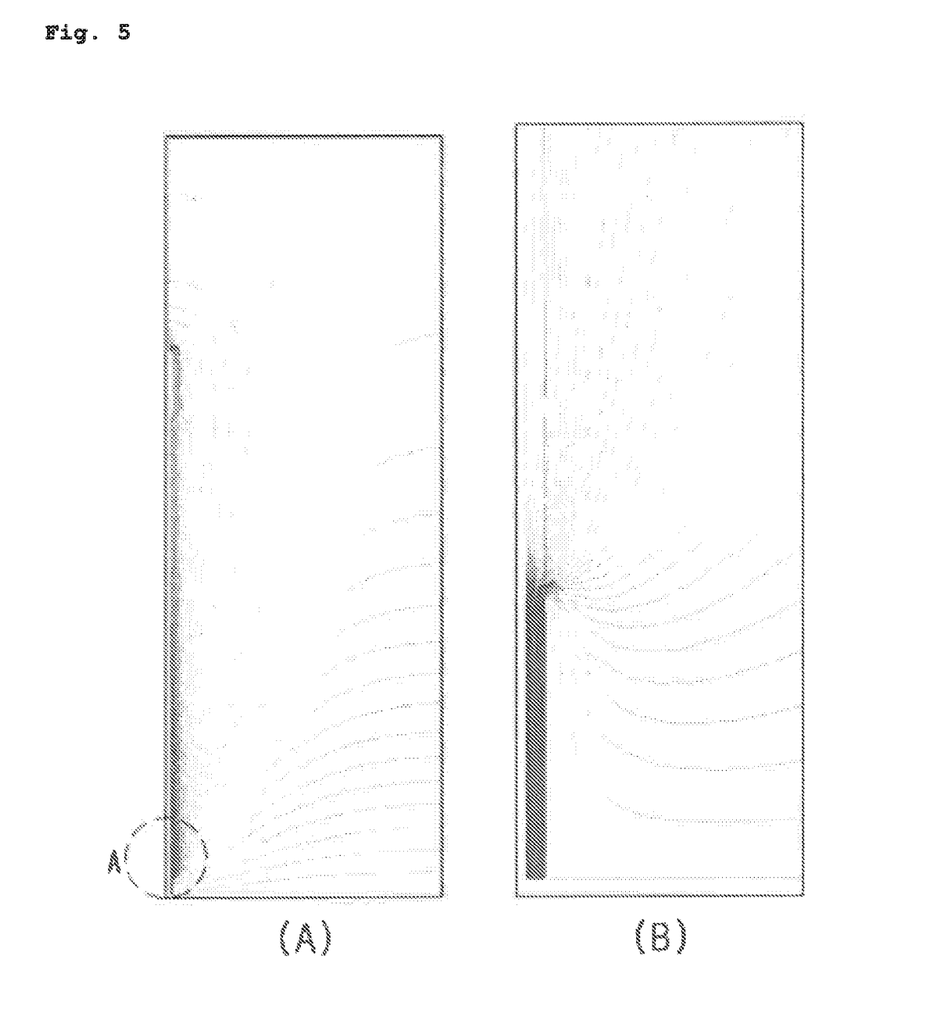
FIG. 5 is a diagram illustrating an electric field distribution at an end portion of a DC cable of one of FIGS. 1 to 4.

In an end portion of a DC XLPE power cable (see the embodiment of FIG. 1 or 2) or a DC paper insulating power cable (see the embodiment of FIG. 3 or 4) (hereinafter referred to as the 'DC cable'), a predetermined-length portion of the outer semiconducting layer 16 or 216 of the DC cable is removed to expose the insulating layer 14 or 214. As described above, when the predetermined-length portion of the outer semiconducting layer 16 or 216 is removed, an electric field is concentrated on an end portion of the outer semiconducting layer 16 or 216, i.e., an end portion of the DC cable remaining after the predetermined-length portion of the outer semiconducting layer 16 or 216 is removed, as illustrated in FIG. 5. FIG. 5 illustrates an electric field distribution in a DC cable when the outer semiconducting layer 16 or 216 is removed. FIG. 5(A) illustrates an electric field distribution at an end portion of a DC cable. FIG. 5(B) is an expanded view of a region A of FIG. 5(A).

Referring to FIG. 5(A), an electric field is concentrated at the bottom of the end portion of the DC cable. In detail, an electric field is concentrated on an end portion of the DC cable from which the outer semiconducting layer 16 or 216 is removed (i.e., the region A), as apparent from FIG. 5(B).

Referring to FIG. 5(B), an electric field is concentrated on a region of the DC cable from which the outer semiconducting layer 16 or 216 is removed. The concentration of the electric field on this region of the DC cable may degrade the insulating performance of the DC cable. Thus, the present invention suggests a termination connection box of a DC cable, which is capable of preventing such local concentration of the electric field.

Figure 6:
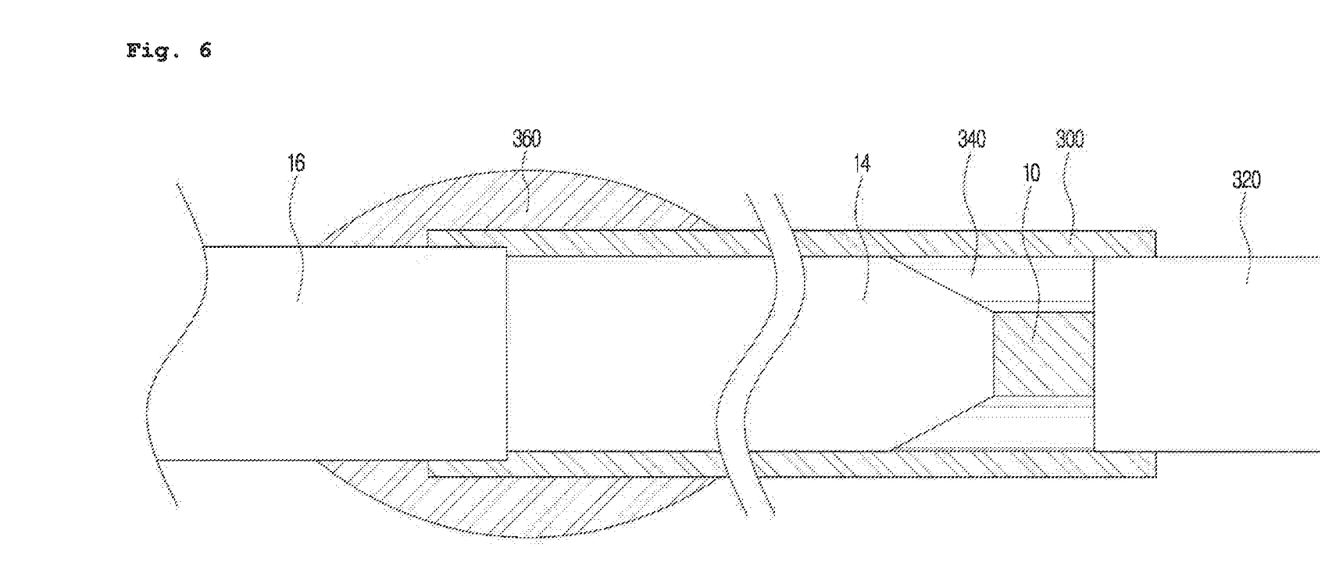
FIG. 6 is a side cross-sectional view of a termination connection box for a DC cable according to an embodiment of the present invention.

FIG. 6 illustrates a structure of a termination connection box for a DC cable according to an embodiment of the present invention. In the present embodiment, the DC cable should be understood to include both an XLPE cable and a paper insulating cable as described above.

Referring to FIG. 6, a conductor 10, an insulating layer 14, and an outer semiconducting layer 16 of the DC cable are as described above with reference to FIGS. 1 to 4 and is not redundantly described here.

As illustrated in FIG. 6, the conductor 10 is exposed when the outer semiconducting layer 16, the insulating layer 14, and an inner semiconducting layer (not shown) are sequentially taken off from the DC cable. The conductor 10 is electrically connected to a conductor withdrawal, rod 320 at an end portion of the DC cable. The conductor withdrawal rod 320 is exposed to the outside to a predetermined length. The conductor withdrawal rod 320 is exposed to be used as a connection means.

A semiconducting layer may be additionally provided on the exposed conductor 10 and an end portion of the insulating layer 14. This semiconductor may be defined as a connecting semiconductor layer so that it may be differentiated from the outer semiconducting layer 16 and the inner semiconducting layers described above. The connecting semiconducting layer may be formed, for example, by performing taping using a semiconducting tape 340 or the like. An outer side of the semiconducting tape 340 is covered with a heat shrinkable tube 300. The heat shrinkable tube 300 is provided on an end portion of the DC cable to electrically connect the outer semiconducting layer 16 and the conductor 10.

For example, the heat shrinkable tube 300 may extend from an end portion of the outer semiconducting layer 16 to cover at least a portion of the conductor withdrawal rod 320 as illustrated in FIG. 6. To this end, the conductor 10 and the conductor withdrawal rod 320 may be electrically connected to each other, be taped with the semiconducting tape 340, and then be inserted into the heat shrinkable tube 300.

In the above structure, one end portion of the heat shrinkable tube 300 overlaps with at least a region of the outer semiconducting layer 16 and covers an outer side of the insulating layer 14, and another end portion thereof may overlap with at least a portion of the conductor withdrawal rod 320. Alternatively, one end portion of the heat shrinkable tube 300 may cover at least a region of the outer semiconducting layer 16 and an outer side of the insulating layer 14, and another end portion thereof may cover at least a portion of the conductor withdrawal rod 320. Thus, one end portion of the heat shrinkable tube 300 is electrically connected to the outer semiconducting layer 16 and another end thereof is electrically connected to the conductor 10 via the conductor withdrawal rod 320. Alternatively, the other end of the heat shrinkable tube 300 may be electrically connected to the inner conductor 10 via the semiconducting tape 340.

The heat shrinkable tube 300 may be configured to have a volume resistance value of about $10^8$ to $10^{11}$ Ωm which is 1/10,000 times than that of the insulating layer 14 of the DC cable. Furthermore, the heat shrinkable tube 300 may be configured to have a relative permittivity of about 15 or more.

The heat shrinkable tube 300 may be formed of, for example, a so-called functionally gradient material or the like. The functionally gradient material may be a mixture of a polymer and a filler, e.g., ZnO, carbon black, silicon carbide (SiC), or the like, and has non-linear electrical characteristics. Thus, space charges may be easily discharged using the non-linear electrical characteristics when the space charges are accumulated in the insulating layer 14. That is, since the insulating layer 14 is covered with the heat shrinkable tube 300 formed of the functionally gradient material, when space charges accumulated in the insulating layer 14 exceeds a predetermined level, a resistance value of the heat shrinkable tube 300 may rapidly decrease to conduct electric current through the insulating layer 14 and the outer semiconducting layer 16, thereby discharging the space charges via the outer semiconducting layer 16.

In a termination connection box for the DC cable including the heat shrinkable tube 300 having the above structure, DC frequency components are zero, compared to AC frequency components, and thus only resistance components remain as insulators. Thus, when end portions of the DC cable including the outer semiconducting layer 16 are covered with the heat shrinkable tube 300, the end portions covered with the heat shrinkable tube 300 may be considered as a structure in which the insulating layer 14 and resistance components are connected in parallel and thus a resistance value thereof decreases. Furthermore, since the outer semiconducting layer 16 and the conductor 10 are electrically connected to each other via the heat shrinkable tube 300, a uniform resistance distribution may be achieved between the outer semiconducting layer 16 and the conductor 10, thereby preventing an electric field from being locally concentrated on end portions of the outer semiconducting layer 16.

According to a termination connection box for the DC cable having the above structure, a voltage which is up to about 2.5 to 3 times than a rated voltage of the cable may be applied.

In FIG. 6, reference numeral '360' denotes a shield layer. For example, the shield layer 360 may be formed by sequentially winding a semiconducting tape, a mesh tape, an insulating tape, and the like.

Figure 7:
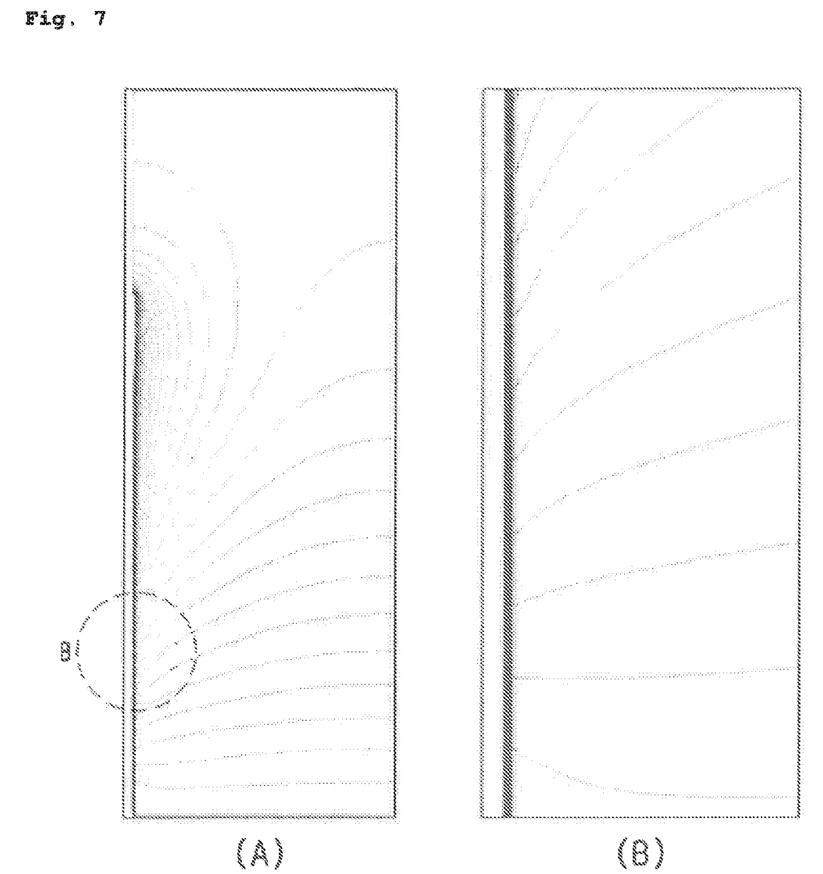
FIG. 7 is a diagram illustrating an electric field distribution in the termination connection box of FIG. 6.

FIG. 7 is a diagram illustrating an electric field distribution in a termination connection box for a DC cable having the above structure. FIG. 7(A) illustrates an electric field distribution at an end portion of a DC cable. FIG. 7(B) is an expanded view of an electric field distribution of a region B, i.e., an end portion of an outer semiconducting layer, of FIG. 7(A).

Referring to FIG. 7(A), an electric field is uniformly distributed at an entire end portion of the DC cable without being locally distributed, compared to FIG. 5(A). In particular, referring to FIG. 7(B), the electric field is uniformly distributed at even an end portion of the outer semiconducting layer without being locally distributed. As described above, when a terminal box for a DC cable according to the present embodiment is applied, an electric field may be prevented from being locally concentrated at an end portion of the DC cable, thereby improving the insulating performance of the DC cable.

Figure 8:
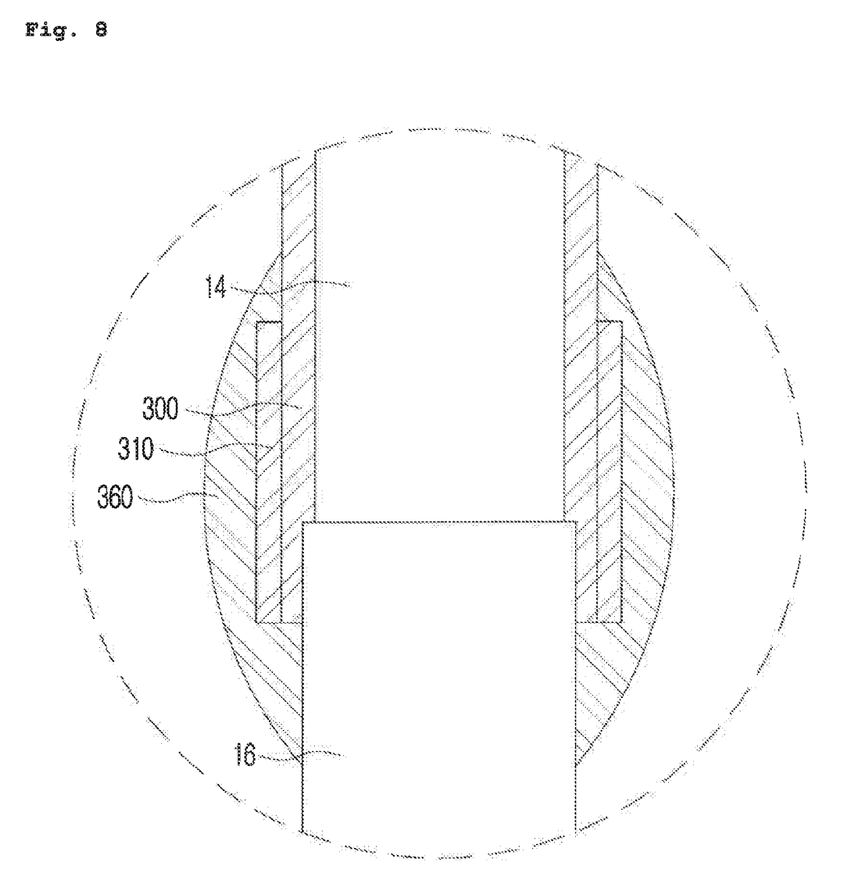
FIG. 8 is a side cross-sectional view of a termination connection box for a DC cable according to another embodiment of the present invention.

FIG. 8 is a side cross-sectional view of a structure of a termination connection box for a DC cable according to another embodiment of the present invention. The embodiment of FIG. 8 is different from that of FIG. 6 described above in that a heat shrinkable tube is provided in a plurality of layers in at least a region of an end portion of the cable. The embodiment of FIG. 8 will now be described focusing on the differences from the embodiment of FIG. 6.

Referring to FIG. 8, when the heat shrinkable tube is provided at an end portion of the termination connection box for the DC cable according to the present embodiment, at least a region thereof may be thicker than the other regions thereof, the heat shrinkable tube may be provided in a plurality of layers, or a plurality of layers of the heat shrinkable tube may overlap with each other. In particular, the heat shrinkable tube in an end region of an outer semiconducting layer 16 may be thicker than in the other regions thereof, the heat shrinkable tube may be provided in a plurality of layers, or a plurality of layers of the heat shrinkable tube may overlap with each other.

For example, a first heat shrinkable tube 300, one end and another end of which are respectively electrically connected to a conductor and the other semiconducting layer 16 of the DC cable, and a predetermined-length second heat shrinkable tube 310 formed on an outer side of the first heat shrinkable tube 300 may be provided on an end portion of the outer semiconducting layer 16. In this case, a resistance component is thicker on the end portion of the outer semiconducting layer 16 due to the first heat shrinkable tube 300, thereby decreasing a resistance value to a lower level to further increase the distance between electric fields, compared to the embodiment of FIG. 6. The thickness of the heat shrinkable tube, i.e., the number of the plurality of layers thereof, may be appropriately adjusted, and is not limited to two layers as illustrated in FIG. 8.

Figure 9:
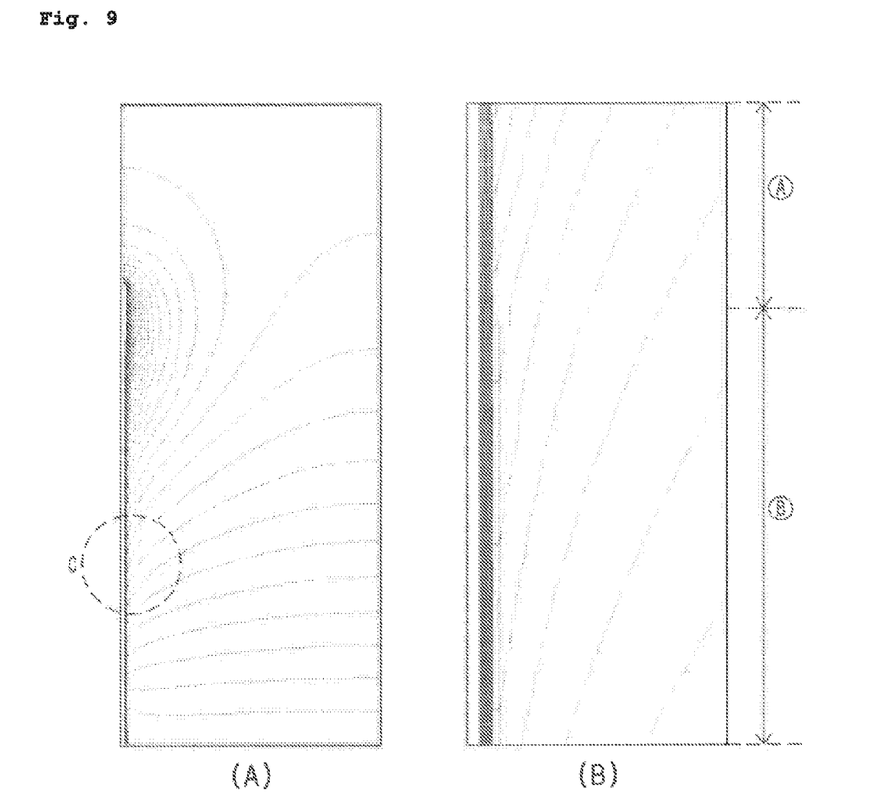
FIG. 9 is a diagram illustrating an electric field distribution in the termination connection box of FIG. 8.

FIG. 9 is a diagram illustrating an electric field distribution in the termination connection box for the DC cable of FIG. 8.

FIG. 9(A) illustrates an electric field distribution at an end portion of a DC cable. FIG. 9(B) is an expanded view of an electric field distribution at an end portion of a region C of FIG. 9(A), i.e., an end portion of an outer semiconducting layer.

Referring to FIG. 9(A), an electric field is uniformly distribute on the entire end portion of the DC cable without being locally concentrated, compared to FIG. 5(A).

In particular, referring to FIG. 9(B), a lower region B corresponds to an overlapping region between the first heat shrinkable tube 300 and the second heat shrinkable tube 310 of FIG. 8, and an upper region A corresponds to a region including only the first heat shrinkable tube 300 of FIG. 8. In FIG. 9(B), the distance between electric fields in the lower region B is greater than that in the upper region A. This is because the first heat shrinkable tube 300 and the second heat shrinkable tube 310 overlap with each other in the lower region B as described above and thus a resistance value of the lower region B is less than that of the upper region A. Accordingly, referring to FIG. 9, an electric field is uniformly distributed at an end portion of the outer semiconducting layer without being locally concentrated. As described above, when a termination connection box for a DC cable according to the present embodiment is applied, an electric field may be prevented from being locally concentrated at an end portion of the DC cable, thereby improving the insulating performance of the DC cable.

In a termination connection box for a DC power cable having the above structure according to an embodiment of the present invention, a uniform resistance distribution may be achieved at an end portion of the DC power cable and a resistance value may be decreased.

According to an embodiment of the present invention, an electric field may be prevented from being locally concentrated on an end portion of an outer semiconducting layer on an end portion of a DC power cable, thereby improving the insulating performance of the DC power cable.

According to an embodiment of the present invention, a uniform resistance distribution may be maintained at an end portion of a DC power cable so that an electric field may be uniformly distributed.

In a termination connection box for a DC cable having the above structure, a voltage which is up to about 2.5 to 3 times than a rated voltage of the cable may be applied.

Furthermore, in a termination connection box according to an embodiment of the present invention, when space charges are locally accumulated in an insulating layer to a predetermined level or more, a resistance value may decrease and thus electric current may be conducted through a conductor and an outer semiconducting layer of the DC power cable, thereby decreasing the amount of the accumulated space charges.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

What is claimed is:

1. A termination connection box for a direct-current (DC) cable, in which when an outer semiconducting layer, a metal sheath provided at an outer side of the outer semiconducting layer and electrically connected to the outer semiconducting layer, an insulating layer, and an inner semiconducting layer are sequentially removed, a conductor is exposed, the termination connection box comprising:
    a connecting semiconducting layer configured to wrap an exposed portion of the conductor and a portion of the insulating layer adjacent to the exposed portion of the conductor;
    a conductor withdrawal rod electrically connected to the conductor; and
    a heat shrinkable tube formed of functionally gradient material having non-linear electrical characteristics,
    wherein the heat shrinkable tube includes:
        a first end electrically connected to the conductor and which covers a portion of the conductor withdrawal rod and the connecting semiconducting layer which wraps the exposed portion of the conductor;
        a second end opposite to the first end, electrically connected to the outer semiconducting layer, and which covers a portion of the outer semiconducting layer; and
        a middle portion positioned between the first end and the second end, and which is in direct contact with and covers an outer circumferential surface of the insulating layer, and
    wherein the heat shrinkable tube is configured to discharge space charges accumulated in the insulating layer via the outer semiconducting layer and the metal sheath when the space charges accumulated in the insulating layer exceeds a predetermined level.

2. The termination connection box of claim 1, wherein at least a portion of the heat shrinkable tube is thicker than a remaining region thereof.

3. The termination connection box of claim 2, wherein the heat shrinkable tube is thicker on the portion of the outer semiconducting layer, which is covered by the heat shrinkable tube, than on a remaining portion of the outer semiconducting layer.

4. The termination connection box of claim 2, wherein the heat shrinkable tube comprises:
    a first heat shrinkable tube configured such that one end and another end thereof on the conductor of the cable are respectively electrically connected to the conductor and the outer semiconducting layer; and
    a second heat shrinkable tube formed on an outer side of the first heat shrinkable tube to a predetermined length.

5. The termination connection box of claim 1, wherein the heat shrinkable tube has a volume resistance of $10^8$ to $10^{11}$ Ωm.

6. The termination connection box of claim 1, wherein the heat shrinkable tube has a relative permittivity of 15 or more.

7. The termination connection box of claim 1, wherein the heat shrinkable tube comprises a mixture of a polymer and at least one among ZnO, carbon black, and SiC.

8. A direct-current (DC) cable comprising the termination connection box of claim 1.

9. The DC cable of claim 8, wherein the DC cable comprises an insulating layer formed of a cross-linked polyethylene composition including 0.2 to 5 parts by weight of magnesium oxide with respect to 100 parts by weight of polyethylene resin.

10. The DC cable of claim 8, wherein the conductor, the inner semiconducting layer, the insulating layer, and the outer semiconducting layer are sequentially formed,
    wherein at least a portion of the insulating layer is formed of compound insulating paper in which kraft paper is stacked on top and bottom surfaces of polypropylene resin.

11. The DC cable of claim 10, wherein the insulating layer comprises insulating paper in which a surface thereof which is in contact with the inner semiconducting layer and a surface thereof which is in contact with the outer semiconducting layer are formed of only kraft paper.

* * * * *